Aug. 27, 1968          H. L. ROSE          3,398,759

VARIABLE FLUID IMPEDANCE AND SYSTEMS EMPLOYING SAME

Original Filed March 29, 1963          2 Sheets-Sheet 2

INVENTOR
HOWARD L. ROSE

BY *Hurvitz + Rose*

ATTORNEYS

United States Patent Office 3,398,759
Patented Aug. 27, 1968

3,398,759
VARIABLE FLUID IMPEDANCE AND SYSTEMS
EMPLOYING SAME
Howard L. Rose, 8823 Lanier Drive,
Silver Spring, Md. 20910
Continuation of application Ser. No. 269,074, Mar. 29,
1963. This application Oct. 21, 1965, Ser. No. 508,628
19 Claims. (Cl. 137—81.5)

This application is a continuation of U.S. application Ser. No. 269,074, filed Mar. 29, 1963, and now abandoned, for Variable Fluid Impedance and Systems Employing Same, by Howard L. Rose.

The present invention relates to pure fluid systems and, more particularly, to a pure fluid resistor which is continuously variable over a predetermined range of resistance values.

There has recently been a development in the field of pneumatic and hydraulic controls relative to devices commonly referred to as pure fluid elements and systems. These devices employ moving and interacting streams of fluid and do not require the use of moving parts to effect the intended control or function. The devices are capable of amplification using the term "amplification" in much the same way as the term is used in the electronic art. The devices are also capable of operation as flip-flops and as logic elements and may be combined into counters and shift registers for use in digital data processing. Analog amplifiers which form one branch of these devices may be employed as amplifiers of pneumatic or hydraulic signals, as oscillators, as elements in monostable multivibrators, etc. What has not been available in this field to date is a variable pure fluid resistance; that is, an element in which the pressure or velocity drop, and therefore energy drop across a resistive element may be varied continuously or discretely without the use of moving parts. The devices of the present invention provide continuously or discretely variable fluid resistances and permit range switching in which variation occurs between limits depending upon the limits desired.

Such a variable resistor may be employed to provide an initially large flow rate through a device and thereafter to reduce the flow due to reduction in requirements of the system. Also a variable resistor may be employed in a resistive-capacitive oscillator circuit so as to provide for frequency sweep of the oscillator. The resistor may be made variable in accordance with temperature so as to provide a temperature stabilizing effect in oscillators. By a simple fluid feedback arrangement, the variable resistor may constitute a pressure regulator.

It is therefore an object of the present invention to provide a pure fluid variable resistor in which resistance may be varied continuously between two limits or may be switched between two predetermined values or may be range switched so as to provide a resistance which is variable over two distinct ranges of resistance.

It is another object of the present invention to provide a pure fluid variable resistor which may be employed with pure fluid elements such as continuously variable amplifiers or bi-stable elements or logic elements or oscillators and which is completely compatible with such elements since it does not require moving parts for control thereof.

The above and still further objects, features and advantages of the present invention will become apparent upon consideration of the following detailed description of several embodiments thereof, especially when taken in conjunction with the accompanying drawings, wherein.

Figure 1:
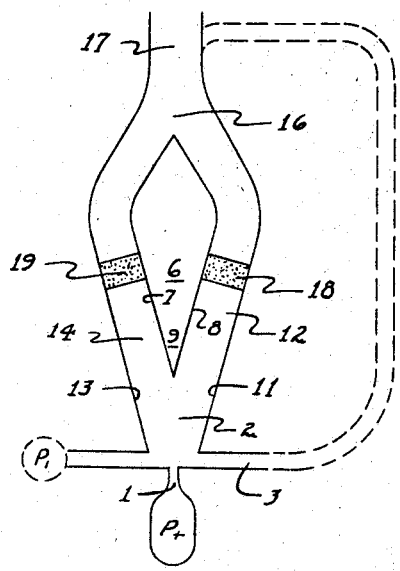
FIGURE 1 is an illustration of a continuously variable resistor which may be employed in the present invention.

Referring now specifically to FIGURE 1 of the accompanying drawings, there is illustrated a continuously variable resistor in accordance with the present invention. The continuously variable resistor is provided with a nozzle 1 for issuing a stream of fluid into an interaction region 2. Also opening into the interaction region is a right control nozzle 3 and a left control nozzle 4. Positioned downstream and symmetrically with respect to the nozzle 1 is an island flow divider 6 having a left sidewall 7, a right sidewall 8 and an apex 9 directed toward the nozzle 1. The element 1 has a right sidewall 11 which, in conjunction with the right sidewall 8 of the flow divider 6 defines a first output passage 12. The resistor 1 also has a left sidewall 13 which, in conjunction with the left sidewall 7 of the flow divider 6, defines a left output passage 14. The passages 12 and 14 define the island divider 6 and rejoin at a point or location 16 to provide a common output channel 17.

Located in the output channel 12 is a fluid resistance 18 which may take many forms. The form of the resistance 18 illustrated is a porous member; for instance, a porous plug, although as will be described more fully in FIGURE 2, a nozzle may be employed to provide the desired load. Other known techniques may be employed to provide a suitable fluid resistance. A second flow resistance 19 is located in the passage 14 and the value of the resistance 19 is chosen to be different from the value of the flow resistance 18. In fact, the values 18 and 19 are chosen to define the upper and lower limits of resistance which may be provided by the device.

Referring now specifically to the operation of the apparatus of FIGURE 1, if the fluid issued by the nozzle 1 divides equally between the channels 12 and 14, then the drop in pressure between the reaction chamber 2 and the junction 16 is equal to the average of the pressure drops across the flow resistances 18 and 19. If, however, control signals are provided to the control nozzles 3 and 4 such that all of the fluid flows through the output passage 12, then the drop in pressure through the unit, and therefore the apparent resistance of the unit is determined completely by the flow resistor 18. Conversely, if all of the fluid issued by the nozzle 1 is constrained to flow through the passage 14 to the channel 17, then the flow impedance is determined wholly by the resistor 19. By varying the proportions of fluid flowing to and through the channels 12 and 14, the value of resistance as seen between the nozzle 1 and the output passage 17 is a function of the proportions of fluid passing through the two resistors 18 and 19. Thus, the value of resistance is continuously variable between the values of the resistance of the resistors 18 and 19 and a continuously variable flow resistor is provided. The unit may be made with an asymmetrical flow divider so that the value of resistance in the absence of control signals may be different from the average value of the two. The degree of asymmetry determines the initial value.

The deflection of the stream issued by the nozzle 1 may be effected by causing fluid to flow through the control passages 3 and 4 so as to deflect the stream by means of stream interaction. On the other hand, it is possible to operate the apparatus on the suction amplifier principle. If the values of the resistors 18 and 19 are large enough, the static pressure in the interaction region 2 may be made greater than the pressure in the surrounding atmosphere.

Therefore, there is a continuous flow of fluid from the reaction regions out through the control passages 3 and 4. By controlling the amount of fluid flowing out of these passages one may then control the differential in pressure across the fluid stream issued by the nozzle 1 and, in consequence, cause the stream to be deflected across the apex of the dividers as desired. In this type of operation the main fluid stream issued by the nozzle 1, in effect, operates as a flexible or deflectable diaphragm between the two regions of different pressure.

The construction of the actual apparatus may take the form of channels formed in a flat plate covered by a further flat plate so as to provide a seal. The seal insures that all fluid in the system must flow through the passages formed in the first of the mentioned plates.

Figure 2:
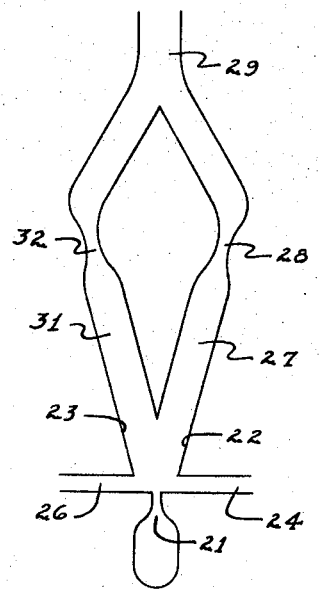
FIGURE 2 is an illustration of a resistance which may be switched between two discrete values.

Referring now to FIGURE 2 of the accompanying drawings, there is illustrated a fluid resistor which may be switched between one of two values. More particularly, the apparatus is a flip-flop type in which, due to boundary layer effects between a fluid stream issued by main nozzle 21 and sidewalls 22 and 23 of the device, the stream attaches to one or the other of the sidewalls 22 and 23. As a result of this type of operation, the stream issued by the nozzle 21 issues entirely from one or the other of the output channels 27 or 29 and remains so directed until a fluid signal is applied through one of the control channels 24 and/or 26 to cause the beam to be switched to the other sidewall. If the fluid stream or beam is attached to the sidewall 22, it flows through the output passage 27 and a load 28 in the form of a nozzle to a final output passage 29. If the fluid is attached to the sidewall 23 and flows through the output passage 31, a second load 32, also in the form of a nozzle, to the final output passage 29. The fluid resistances presented by the loads 28 and 32 are of different values so that the value of resistance appearing between nozzle 21 and passage 29 is a function of the position of the stream. Thus, by switching the beam between the channels 27 and 31, the value of the resistance in the system is switched.

Switching is effected in this device by either stream interaction wherein the stream is introduced through one of the control passages; for instance, passage 24 to deflect the power stream to the wall 23 or by introducing fluid through the passage 24 to raise the pressure in the boundary layer region between the stream and the wall 22 to a value which is greater than the pressure on the left side of the stream thereby deflecting the stream toward the wall 23. As soon as the stream approaches the wall 23 and a boundary layer condition is set up, the stream remains attached to this wall until fluid is introduced through the control nozzle 26 to either cause the stream to deflect to the wall 22 by momentum interchange or by building a sufficient differential in pressure across the stream to produce the deflection.

Figure 3:
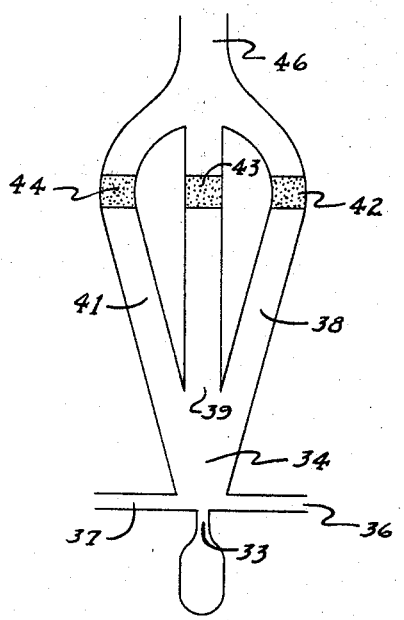
FIGURE 3 is a schematic diagram of a pure fluid resistance which may be varied over two different ranges.

Referring now specifically to FIGURE 3 of the accompanying drawings, there is illustrated a continuously variable resistance employing three different values of loads so that range switching may be obtained. More particularly, a power stream is issued by a power nozzle 33 into an interaction region 34. Control nozzles 36 and 37 are let into the interaction region 34 and are employed to control the position of the power stream issued by the nozzle 33 in any one of the various manners described with respect to the operation of FIGURE 1. Three outlet channels 38, 39 and 41 are provided each having a resistor of a different value, the resistors being designated by the reference numerals 42, 43 and 44, respectively. All of the flow channels 38, 39 and 41 are joined to a common output channel 46.

In the operation of the apparatus, the resistor 43 is chosen, for purposes of illustration, to have an absolute value of one, the value of the resistor 42 is five with the value of the resistor 44 being two. If stream is deflected so that it divides between the channels 38 and 39, the value of the resistance between the nozzles 33 and 46 may be varied continuously between absolute values of 1 and 5. However, if it is desired to provide a more precise control of the value of the resistance in a smaller range within the one-to-five range, then the stream is variable applied between the outlet passages 39 and 41. In this case, the total variation is an absolute value of only one and the selection of values within that range may be more precise than would be available where one is working over a larger range. Of course, the value of the resistor 42 may be less than the value of the resistance of the resistor 43 so that a larger overall range may be covered in one unit.

Figure 6:
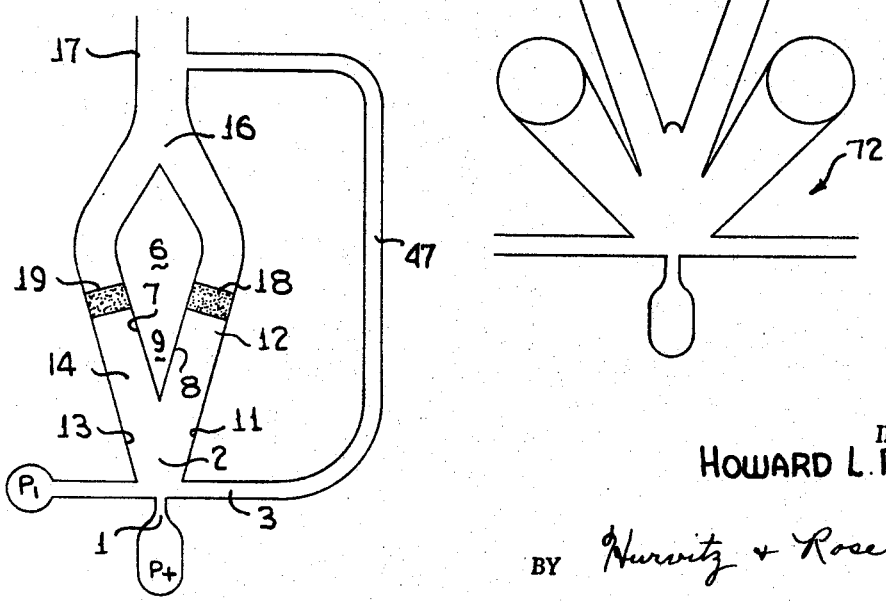
FIGURE 6 is a schematic diagram of a pressure regulator employing the device of FIGURE 1.

The apparatus of FIGURE 1 may be employed as a pressure regulator as illustrated in FIGURE 6 wherein elements common to FIGURES 1 and 6 carry the same reference numerals. By adding a fluid feedback path 47 between the final output channel 17 and control nozzle 3, fluid issues into the interaction region at a pressure which is a function of the pressure in the channel 17. Fluid at a fixed value $P_1$ is applied to control passage 4. The value of resistance 19 is greater than the value of resistance 18. If the pressure in channel 17 rises, the stream is deflected more to the channel 14 and the total pressure drop is increased. If the pressure in passage 17 falls, the stream is deflected right and the pressure drop decreases.

Figure 4:
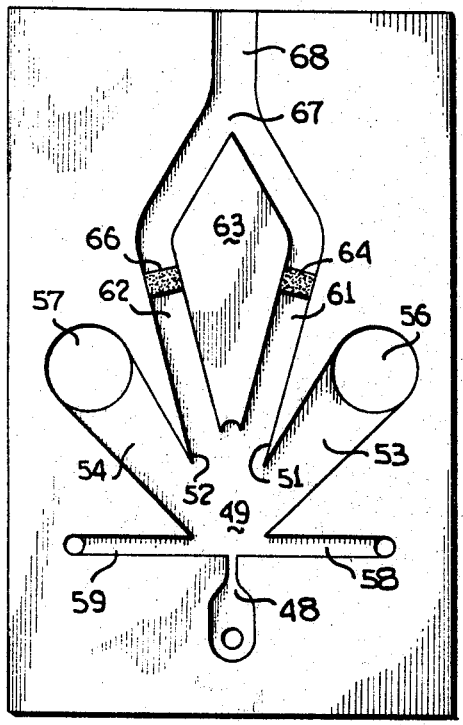
FIGURE 4 is a schematic diagram of a pure fluid resistance operating at ambient pressure.

All of the devices illustrated tend to operate at a pressure at some region in the interaction chamber which is other than ambient or atmospheric. Referring specifically to FIGURE 4 of the accompanying drawings, there is illustrated a pure fluid resistor employing a side-vented amplifier.

Specifically, a power nozzle 48 issues fluid into an interaction region 49. Sidewalls 51 and 52 of the device are interrupted by lobes 53 and 54, respectively. The lobes are opened to the ambient atmosphere through ports 56 and 57. Control passages or nozzles 58 and 59 are let into the interaction region 49 between the power nozzle 48 and the lobes 53 and 54, respectively.

The apparatus is provided with two output passages 61 and 62 separated by an island divider 63. Fluid resistors 64 and 66 of different values are inserted in passages 61 and 62, respectively. The passages are joined at junction 67 to form a common outlet passage 68.

The operation of the apparatus of FIGURE 4 is quite similar to that of FIGURE 1. However, due to the vented lobes 53 and 54, atmospheric pressure is maintained in the interaction region 49 and deflection of the power stream can be deflected only by momentum interchange between the power stream and control streams.

A center vented amplifier may also be employed. Thus, in FIGURE 3, the channel 39 above the resistor 43 would be disconnected from the output channel 46 and connected through an appropriate aperture to ambient atmosphere. The center channel 39 would then tend to supply entrainment fluid and prevent back flow through the channels.

By reference to FIGURE 2, it is apparent that the fluid resistors as such can be replaced by fluid capacitors so that one may selectively switch between two fluid capacities. It is also possible to switch between fluid inertances by the same technique.

The apparatus of the invention is also applicable to use with an integrating circuit which is operable over a variable period. For instance, one may define a circuit which follows the equation $$e_0 = \int_{t_1}^{t_2} e_i dt \qquad (1)$$

where the interval between $t_1$ and $t_2$; that is, the integrating interval is a variable.

Figure 5:
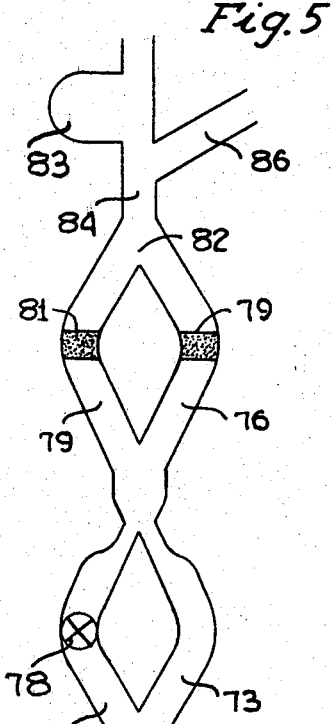
FIGURE 5 is a schematic diagram of an integrating circuit having a variable integrating interval.

Referring specifically to FIGURE 5 of the accompanying drawings, an apparatus for performing such a function is illustrated. An input signal $e_i$ is developed in an output channel 71 of an analog fluid amplifier generally designated by the reference numeral 72. The signal $e_i$ is divided, generally equally, between two channels 73 and 74 which are adapted to issue fluid streams into channels 76 and 77, respectively. The channel 74 is provided with a variable adjustment 78 for attenuating the pressure of the fluid flowing therethrough. If it is assumed that the device 78 is initially set so as not to interfere in any way with the flow through the channel 74 then the fluid streams issuing from the chanels 73 and 74 divide equally between the channels 76 and 77. This type of arrangement; that is, the use of the equal angle flow into the channel 76 and 77 is utilized to render any variation in desired time constant independent of the input signal $e_i$. For instance, if one were to issue a fluid stream which was variable with $e_i$ from the nozzle 48 of FIGURE 4 and insert a variable signal for controlling the integrating interval from the channel 59, then even though the signal issued from the channel 59 were held constant a variation of the input signal issuing from the orifice 48 would change the time constants of the circuit since the relative momenta of the streams would vary. However, with the arrangement illustrated in FIGURE 5, since the streams issuing from the channels 73 and 74 are each very closely equal to one-half the total input signal, variations in that signal do not affect in any manner the directivity of the final recombined signal. By varying the flow impedance inserted by the device 78, the proportions of fluid passing through the channel 76 and 77 may be varied.

The channels 76 and 77 are provided with different fluid impedances 79 and 81 so that the total fluid resistance appearing between the output channel 71 and the junction point 82 of the channels 76 and 77 is a function of the setting of the device 78 only. A fluid capacitor 83 is provided in a common channel 84 formed by the confluence of the channels 76 and 77 so that the fluid resistors 79 and 81 in conjunction with the fluid capacitance 83 provide an integrating circuit. By controlling the amount of resistance inserted by the resistors 79 and 81, which in turn is a function of the proportions of fluid flowing through the channels 76 and 77, the integrating interval may be controlled and therefore, referring to Equation 1 above, the interval $t_2-t_1$ is variable. An output signal is taken from a channel 86 which is let into the channel 84 from a side thereof.

The apparatus of FIGURE 5 provides, in effect, a time constant circuit which in the present application is employed as an integrator having a variable integrating interval. The valve 78 may comprise a pure fluid system or, since usually it is not desired to produce rapid variations in the integrating interval but merely to preset it for a specific condition, a conventional, manually controllable valve may be employed.

By inserting the fluid capacitance in the channel 71, and removing it from channel 84, a variable time constant differentiating system may be provided. An outlet channel would be let into the channel 71 prior to its division into channels 73 and 74.

While I have described and illustrated one specific embodiment of my invention, it will be clear that variations in the details of construction which are specifically illustrated and described may be resorted to without departing from the true spirit and scope of the invention as defined in the appended claims.

What I claim is:

1. A variable pure fluid impedance comprising at least two output channels, an interaction region, means for directing fluid through said interaction region toward said output channels, means for developing in said interaction region a differential in pressure for deflecting said stream so as to vary the proportions of fluid directed to each of said output channels, means located in said output channels having different values of fluid impedance, said output channels being joined downstream of said fluid impedances to form a common output channel.

2. The combination according to claim 1 wherein said interaction region has sidewalls located relative to the centerline of said means for directing to establish boundary layer effects between said stream and said sidewalls.

3. The combination according to claim 1 wherein there are provided at least three outlet channels joined to form a common outlet channel.

4. The combination according to claim 1 wherein said interaction region is bounded by sidewalls set back so that said stream is variably positionable between two extremes wherein all of the fluid is directed to one and another of said output channels.

5. The combination according to claim 1 wherein said means for directing fluid and said means for developing a differential in pressure comprise fluid flow paths each for directing fluid toward a different one of said two output channels, means for connecting said fluid flow paths to a common source of fluid under pressure.

6. A variable pure fluid impedance comprising at least two output channels, an interaction region, means for directing fluid through said interaction region toward said output channels, means for developing in said interaction region a differential in pressure for deflecting said stream so as to vary, as a continuous function between two extremes, the proportions of fluid directed to each of said output channels, means located in said output channels having different values of fluid resistance, said output channels being joined downstream of said fluid resistance means to form a common output channel, a chamber constituting a fluid capacitor located in said common output channel, and a further fluid output channel communicating with said common output channel between said fluid capacitor and the junction of said two output channels.

7. The combination according to claim 6 wherein said means for directing fluid and said means for developing a differential in pressure comprise fluid flow paths each for directing fluid toward a different one of said two output channels, and means for connecting said fluid flow paths to a common source of fluid under pressure.

8. The combination according to claim 7 further comprising a variable flow impedance in one of said fluid flow paths.

9. A variable pure fluid impedance comprising at least two output channels, an interaction region, means for directing fluid through said interaction region toward said output channels, means for developing in said interaction region a differential in pressure for deflecting said stream so as to vary, as a continuous function between two extremes, the proportions of fluid directed to each of said output channels, means located in said output channels having different values of fluid resistance, said output channels being joined downstream of said fluid resistance means to form a common output channel, a chamber constituting a fluid capacitor located in said common output channel, and a fluid feedback path from said common output channel to said means for developing a differential pressure, thereby to regulate the pressure in said common output channel.

10. A variable pure fluid element comprising at least two output channels, an interaction region, means for directing a stream of fluid through said interaction region toward said output channels, control means for directing flow of fluid against said stream of fluid to vary the proportions thereof received by said output channels, a first and second fluid impedances each of a different value and each located in a different one of said output channels, a common channel and means joining said output channels to said common channel such that the only fluid flowing in said common channel is derived from said output channels.

11. A pure fluid variable impedance comprising a pure fluid amplifier having an interaction region, at least a pair of output channels, a power nozzle for directing fluid across said interaction region toward said output channels and control means for developing a variable differential in pressure across said control stream so as to vary differentially the relative quantities of fluid directed to said output passages, flow resistance means providing different impedances to flow through each of said output passages, a common passage, said output channels converging downstream of said flow resistance means to form a single channel connected to one end of said common passage and fluid utilization means connected to said common passage downstream of said one end thereof.

12. A pure fluid variable impedance comprising a pure fluid amplifier having an interaction region, at least a pair of output channels, a power nozzle for directing fluid across said interaction region toward said output channels and control means for developing a variable differential in pressure across said control stream so as to vary differentially the relative quantities of fluid directed to said output passages, flow resistance means providing different impedances to flow through each of said output passages, a common passage, and further means for producing in said common passage a flow parameter which is a function of the relative quantities of fluid directed to each of said output passages, said further means comprising convergence of said output passages downstream of said flow resistance means into a single passage connected to said common passage.

13. A pure fluid variable impedance comprising a pure fluid proportional amplifier having an interaction region, a pair of sidewalls defining opposite sides of said interaction region, a pair of output passages located at one end of said interaction region, a power nozzle for issuing a stream of fluid across said interaction region toward said output passages, said sidewalls being located relative to said stream of fluid such as to prevent the formation of boundary layer effects between said stream and said sidewalls, control means for developing across said stream of fluid a variable differential in pressure to deflect said stream and differentially vary the proportions of the stream of fluid directed to said output passages as a proportional function of the differential in pressure developed by said control means, first and second flow resistances each of a different resistance value, each of a said flow resistances being connected in a different one of said output passages, said output passages converging at an acute angle downstream of said resistances into a common passage, said acute angle being such as to provide a continuous dynamic flow path from said output passages into said common passage whereby the flow and pressure in said common passage is an average function of the relative quantities of fluid directed to each of said output passages.

14. A pure fluid variable impedance comprising a pure fluid proportional amplifier having an interaction region, a pair of sidewalls defining opposite sides of said interaction region, a pair of output passages located at one end of said interaction region, a power nozzle for issuing a stream of fluid across said interaction region toward said output passages, said sidewalls being located relative to said stream of fluid such as to prevent the formation of boundary layer effects between said stream and said sidewalls, control means for developing across said stream of fluid a variable differential in pressure to deflect said stream and differentially vary the proportions of the stream of fluid directed to said output passages as a proportional function of the differential in pressure developed by said control means, first and second flow resistances each of a different resistance value, each of a said flow resistances being connected in a different one of said output passages, a common passage having a uniform cross-sectional area over a length greater than either of said dimensions of said cross-sectional area, said output passages converging at an acute angle downstream of said resistances into said common passage, said common passage having a flow therein which is directed away from said power nozzle and which is a function of the relative quantities of fluid directed to each of said output passages.

15. A pure fluid variable impedance comprising a pure fluid amplifier having an interaction region, at least a pair of output channels, a power nozzle for directing fluid across said interaction region toward said output channels and control means for developing a variable differential in pressure across said control stream so as to vary differentially the relative quantities of fluid directed to said output passages, flow resistance means providing different impedances to flow through each of said output passages, a common passage, said output channels converging at an acute angle downstream of said flow resistance means into said common passage, said common passage having a flow therein which is directed away from said power nozzle and which is a function of the relative quantities of fluid directed to each of said output passages.

16. A pure fluid variable impedance comprising a pure fluid amplifier having an interaction region, at least a pair of output channels, a power nozzle for directing fluid across said interaction region toward said output channels and control means for developing a variable differential in pressure across said control stream so as to vary differentially the relative quantities of fluid directed to said output passages, flow resistance means providing different impedances to flow through each of said output passages, a common passage having a uniform cross-sectional area over a length greater than either of said dimensions of said cross-sectional area, said output passages converging at an acute angle downstream of said flow resistance means into said common passage, said common passage having a flow therein which is directed away from said power nozzle and which is a function of the relative quantities of fluid directed to each of said output passages.

17. A variable pure fluid impedance comprising at least two output channels, an interaction region, means for directing fluid through said interaction region toward said output channels, means for developing in said interaction region a differential in pressure for deflecting said stream so as to vary, as a continuous function between two extremes, the proportions of fluid directed to each of said output channels, means located in said output channels having different values of fluid resistance, said output channels being joined downstream of said fluid resistance means to form a common output channel and a chamber constituting a fluid capacitor located in said common output channel.

18. A multi-level fluid pressure device comprising:
(a) a fluid output channel with an inlet end and an outlet end;
(b) first and second fluid resistance means each with an inlet end and an outlet end, with said outlet end of each of said first and second fluid resistance means being connected to the inlet end of said fluid output channel to enable transfer of fluid energy from each of said first and second fluid resistance means to said fluid output channels, said first and second fluid resistance means having unequal resistance characteristics such that a fluid energy change at their respective inlet ends produces unequal pressure changes to be manifested at their outlet ends, and
(c) a fluid energy supply means connected to the inlet ends of said first and second fluid resistance means which is selectively actuable for shifting, in substantially simultaneous fashion, the fluid energy for one of said inlet ends of one of said first and second fluid resistance means to the other inlet end of the other of said first and second fluid resistance means so that the fluid pressure at the outlet end of said fluid output channel has various significant pressure levels consisting of at least a low energy level when there is a fluid output from one of said outlet ends of said first and second fluid resistance means and a higher energy level when there is fluid output from both of said outlet ends of said first and second fluid resistance means.

19. The device of claim 18 wherein the fluid energy supply means consists of a pure fluid amplifier of the type including a power stream input channel, first and second power stream output channels which in turn are respectively connected to the inlet ends of said first and second fluid resistance means, and at least one control stream input channel adapted to receive a selectively applied control stream for deflecting the power stream in a manner to shift the power fluid from said first power stream output channel to said second power stream output channel.

References Cited

UNITED STATES PATENTS

| | | | |
|---|---|---|---|
| 3,159,168 | 12/1964 | Reader | 137—81.5 |
| 3,238,959 | 3/1966 | Bowles | 137—81.5 |
| 458,762 | 9/1891 | Charonnat | 138—45 |
| 1,679,219 | 7/1928 | Huff | 138—45 |
| 3,001,539 | 9/1961 | Hurvitz | 137—81.5 |
| 3,001,698 | 9/1961 | Warren | 137—81.5 X |
| 3,024,805 | 3/1962 | Horton | 137—81.5 |
| 3,093,306 | 6/1963 | Warren | 137—81.5 |
| 3,171,421 | 3/1965 | Joesting | 137—81.5 |
| 3,192,938 | 7/1965 | Baver | 137—81.5 |

OTHER REFERENCES

"Generating Timed Pneumatic Pulses," R. E. Norwood, I.B.M. Technical Disclosure Bulletin, vol. 5, No. 9, February 1963, pp. 13 and 14.

SAMUEL SCOTT, *Primary Examiner.*